Patented Sept. 27, 1949

2,482,891

UNITED STATES PATENT OFFICE 2,482,891

SOLID, STABLE CHLORINE DIOXIDE GENERATING COMPOSITIONS

Royden N. Aston, Niagara Falls, N. Y., assignor to Mathieson Chemical Corporation, a corporation of Virginia No Drawing. Application March 16, 1945, Serial No. 583,165

5 Claims. (Cl. 252—187)

1

This invention relates to the production of chlorine dioxide and more especially pertains to a composition which in contact with water evolves chlorine dioxide. The composition is particularly valuable for use in the bleaching of a variety of organic materials and especially cellulosic materials.

My composition is a solid mixture in which the active ingredients are a salt of chlorous acid and a solid organic acid anhydride. It is rendered stable through the inclusion of a desiccant and it may also contain inert diluent materials. Each of the components of the composition is most preferably present in finely powdered form. The composition may be prepared using any suitable mixing device, for example, a mixing drum of the type designed for the intimate admixing of fine powders. Most suitably, the desiccant is either admixed with the chlorous acid salt or with the anhydride or with both the salt and anhydride before the salt and anhydride are mixed with each other, and particularly when the salt contains an appreciable amount of water, i. e., 2 to 3%.

Alkali metal chlorides and alkaline earth metal chlorites are the most readily available salts of chlorous acid and are preferred for use according to the invention, but other salts of chlorous acid may be employed. Of the alkali metal and alkaline earth metal chlorites I particularly prefer sodium chlorite and calcium chlorite.

Anhydrides effective in my composition include both open chain and cyclic anhydrides. The anhydride is most preferably at least slightly soluble in water. In the aromatic series, the anhydrides of polybasic acids, such as phthalic acid, have been found to give somewhat better results than other anhydrides of this series. Substituted aromatic acid anhydrides may be used, provided readily oxidizable substituents are avoided. Suitable substituent groups include the halogens—fluorine, chlorine, bromine and iodine-, alkoxy- such as methoxy, ethoxy, tertiary-butoxy and the like—nitro and sulfonic acid groups, among others. These groups possess relatively high stability toward oxidation as compared with amino, aldehydo and similar groups.

Aliphatic polybasic carboxylic acids, e. g., succinic, maleic, glutaric, glutaconic, etc., form heterocyclic anhydrides which are suitable for use according to this invention. Substituents such as halogen, alkoxy, etc., mentioned as suitable with respect to aromatic acid anhydrides may be present in these anhydrides derived from aliphatic polybasic acids, often with advantage. Thus, chlorosuccinic anhydride has greater stability with respect to hydrolysis than succinic anhydride.

Of the anhydrides of the aliphatic monobasic acids, those having 12 or more carbon atoms, e. g., lauric, myristic, palmitic, stearic, are in general

2 suited for use in the composition of the invention. The anhydrides of unsaturated aliphatic monobasic acids which are solids at room temperature may be useful when they are sufficiently stable toward chlorites. A stable substituent, such as halogen, may be present in the aliphatic monobasic acid anhydride.

The composition of the invention may comprise a mixed anhydride, i. e., an anhydride containing different acid residues in the same molecule, or it may contain a mixture of two or more anhydrides, for example, a mixture of succinic and glutaric acid anhydrides. By using mixed anhydrides or mixtures of anhydrides in the composition, the rate of evolution of chlorine dioxide upon contact of the composition with water may be nicely controlled.

The ratio of anhydride to chlorite in my composition may vary within wide limits but I usually employ from 0.1 to 1.0 moles of anhydride for each mole of chlorite.

I have obtained excellent results using sodium oxide as the desiccant in my composition but other compounds, for example, sodium hydroxide, anhydrous calcium chloride and the like may be substituted or used in addition to sodium oxide. It is my preferred practice to use as little of the desiccant as possible to render the composition stable. In the absence of a desiccant, undesirable reaction between the chlorite and anhydride may occur, particularly where the chlorite contains in excess of 1% water. The amount of desiccant required to stabilize the composition will vary depending upon the particular desiccant used and other factors. From 2 to 5% of sodium oxide usually suffices. Where sodium hydroxide is used an amount up to about 15–20% may be necessary or desirable.

Since I have found that many of the anhydride-chlorite mixtures tend to explode on percussion, I customarily include in my composition, as a diluent, a considerable proportion of an anhydrous inorganic salt such as sodium chloride, sodium carbonate, sodium di- and monohydrogen phosphate, trisodium phosphate, sodium bicarbonate or the like. In addition to serving as a diluent the salt may fulfill some other purpose, for example, it may act as a pH control agent upon mixing of the composition with water. I generally prepare the composition so that it contains from 10–50%, more preferably 20–40%, of the diluent salt.

The production of chlorine dioxide using the composition of the invention may be achieved by simply adding the composition to water or vice versa. I have found that the reaction between the chlorite and anhydride proceeds at room temperature and below as well as at elevated temperatures. At elevated temperatures, the evolution of chlorine dioxide gas is increased. I prefer to effect the reaction at a temperature between room temperature and about 80° C., but in some cases, it may be desirable to use lower or higher temperatures.

I usually mix my composition with water in such proportions as to give a solution in which the concentrations of the chlorite and anhydride are initially, 0.1 mole per liter, and from .01 to 0.1 mole per liter, respectively. At the higher concentrations particularly, it is advisable to introduce an inert gas into or immediately above the reacting solution in order to dilute the chlorine dioxide, as generated, to a safe concentration. Gases suitable for this purpose include air, nitrogen, carbon dioxide or other non-oxidizable or difficultly oxidizable gases. This practice also aids in removing chlorine dioxide from the solution and may serve to increase the rate of reaction.

My invention is further illustrated by the following examples in which parts are by weight. It is understood that these examples will not be taken as in any way limiting the scope of the invention.

Example I

A stable, solid composition which evolved chlorine dioxide upon contact with water was prepared by mixing powdered sodium chlorite with powdered phthalic anhydride and a small amount of sodium monoxide which served as a desiccant. According to one method of using the composition, water vapor, preferably diluted with air or other inert gas, is passed therethrough. The exit gases contain a large proportion of chlorine dioxide.

Example II

A mixture of 25 parts of powdered sodium chlorite, 33 parts of powdered phthalic anhydride and three parts of anhydrous calcium chloride gave a stable composition containing 50.2% of available chlorine. The composition liberated chlorine dioxide when added to water.

Example III

The following components in powdered form were admixed to obtain a stable solid composition: sodium chlorite, 25 parts; phthalic anhydride, 33 parts; and sodium hydroxide, 10 parts. This mixture contained 43.7% of available chlorine and liberated chlorine dioxide on addition to water.

Example IV

A stable, solid mixture was prepared from the following components, employed in powdered form: sodium chlorite, 25 parts; phthalic anhydride, 33 parts; sodium monoxide, 3 parts; and sodium bicarbonate, 30 parts. This mixture contained 40.8% of available chlorine and liberated chlorine dioxide on addition to water.

Example V

A mixture having the same composition as the mixture of Example IV except for the substitution of 30 parts of sodium carbonate for the 30 parts of sodium bicarbonate showed an available chlorine content of 45.0% and liberated chlorine dioxide when wetted with water.

Example VI

A composition similar to those of the preceding two examples but containing 30 parts of trisodium phosphate instead of sodium carbonate or sodium bicarbonate was prepared. It was a stable mixture containing 41.0% of available chlorine and liberated chlorine dioxide on treatment with water.

Example VII

A stable, solid mixture which on treatment with water liberated chlorine dioxide was prepared by mixing powdered maleic anhydride 33 parts, powdered calcium chlorite 25 parts, and sodium hydroxide 10 parts.

Chlorine dioxide generated through the use of the composition of the invention may be employed for example, in the bleaching of cellulose or other materials including oils, fats, waxes, flour, etc., or it may be converted by chemical reaction into other products. The generated chlorine dioxide may be used in situ or it may be used removed from the generating solution or mixture. Cellulosic material may be bleached to a high white without appreciable degradation by treatment with an aqueous solution of my composition.

I claim:

1. A stable, solid, substantially anhydrous composition consisting essentially of an organic acid anhydride, free of readily oxidizable substituents and a chlorite of the group consisting of the alkali and alkaline earth metal chlorites, the anhydride and chlorite being present in molar proportions within the range of 0.1:1 to 1:1.

2. A stable, solid, substantially anhydrous composition consisting essentially of a polybasic organic acid anhydride, free of readily oxidizable substituents and sodium chlorite, the anhydride and chlorite being present in molar proportions within the range of 0.1:1 to 1:1.

3. A stable, solid, substantially anhydrous composition consisting essentially of an anhydride of a dibasic carboxylic acid and sodium chlorite, the anhydride and chlorite being present in molar proportions within the range of 0.1:1 to 1:1, the anhydride and chlorite accounting for not less than 30% of the weight of the composition.

4. A stable, solid, substantially anhydrous composition consisting essentially of phthalic anhydride and sodium chlorite, the anhydride and chlorite being present in molar proportions within the range of 0.1:1 to 1:1.

5. A stable, solid, substantially anhydrous composition consisting essentially of maleic anhydride and sodium chlorite, the anhydride and chlorite being present in molar proportions within the range of 0.1:1 to 1:1.

ROYDEN N. ASTON.

REFERENCES CITED

The following references are of record in the file of this patent:

UNITED STATES PATENTS

| Number | Name | Date |
|---|---|---|
| 1,961,576 | Taylor | June 5, 1934 |
| 2,022,262 | White | Nov. 26, 1935 |
| 2,071,091 | Taylor | Feb. 16, 1937 |
| 2,253,368 | Dubeau | Aug. 19, 1941 |
| 2,338,268 | Stossel et al. | Jan. 4, 1944 |
| 2,358,866 | MacMahon | Sept. 26, 1944 |
| 2,436,134 | Aston | Feb. 17, 1948 |

FOREIGN PATENTS

| Number | Country | Date |
|---|---|---|
| 118,721 | Australia | July 18, 1944 |